United States Patent [19]

Kiuchi

[11] Patent Number: 4,770,359
[45] Date of Patent: Sep. 13, 1988

[54] TAPE DEFECT ELIMINATING METHOD AND APPARATUS

[75] Inventor: Seiji Kiuchi, Kanagawa, Japan

[73] Assignee: Fuji Photo Film Co., Ltd., Kanagawa, Japan

[21] Appl. No.: 10,528

[22] Filed: Feb. 3, 1987

[30] Foreign Application Priority Data

Feb. 3, 1986 [JP] Japan .................................. 61-21377

[51] Int. Cl.⁴ .......................................... B65H 19/20
[52] U.S. Cl. ................................................. 242/56 R
[58] Field of Search .............. 242/56 R; 156/506, 505

[56] References Cited

U.S. PATENT DOCUMENTS

| | | | |
|---|---|---|---|
| 3,940,080 | 2/1976 | Bennett | 242/56 R X |
| 4,216,052 | 8/1980 | Zielke | 242/56 R X |
| 4,598,539 | 7/1986 | Stahlecker | 57/263 |
| 4,599,130 | 7/1986 | Woodley | 242/56 R X |
| 4,632,327 | 12/1986 | Kreeft et al. | 242/56 R |

Primary Examiner—Stuart S. Levy
Assistant Examiner—Katherine Matecki
Attorney, Agent, or Firm—Sughrue, Mion, Zinn, Macpeak & Seas

[57] ABSTRACT

A method and apparatus for repairing a defective portion of tape wound onto a tape cassette. The tape is pulled out of the cassette and held by a stationary and movable table such that the defective portion is on the part held by the stationary table. The tape is cut between the tables. A second movable table holding an end of a disposal tape replaces the first movable table and the disposal tape is spliced to the tape with the defect. The defect is wound toward the disposal reel and then cut. The good remaining tape pieces on the stationary and first movable tables are then spliced together.

5 Claims, 9 Drawing Sheets

TAPE DEFECT ELIMINATING METHOD AND APPARATUS

BACKGROUND OF THE INVENTION

1. Field of the Invention

This invention relates to a method of eliminating defective parts from a magnetic tape wound on tape winding members such as reels.

2. Background of the Invention

In a Beta or VHS system video tape cassette, 8 mm video tape cassette, or other audio tape cassette, a pair of tape winding members such as reels on which a magnetic tape has been wound are loaded into the cassette. The magnetic tape has leader tapes at both ends, i.e., it is fastened through the leader tapes to the reels. The magnetic tape is spliced to the leader tapes respectively with two pieces of splicing tape (hereinafter referred to as "splicing tape pieces"). The splicing tape pieces are bonded to the rear side of the magnetic tape (opposite to the side where the magnetic layer is formed) so that the tape running operation is smoothly carried out.

However, the junction accuracy of the magnetic tape and each of the leader tape may be low, for instance, in the case where the magnetic tape is butt-joined to the leader tapes for which the junction accuracy as to the gap between the magnetic tape and each of the leader tapes may be low. Such a low junction accuracy may cause a variety of difficulties. In a magnetic tape cassette, the magnetic tape is laid across the front opening of the cassette case. Therefore, during the assembling operation of the cassette, the magnetic tape may be damaged (near the junction of the magnetic tape and the leader tape) by members such as tape guides provided near the front opening. Especially where the magnetic tape cassette manufacturing method is such that a magnetic tape is wound on a pair of reels and then the pair of reels are loaded in the cassette case, the part of the magnetic tape which is disposed at or near the front opening is liable to be damaged. On the other hand, the magnetic tape thickness has been reduced with the development of high-density data recording and reproducing techniques. This further increases the tendency to damage the magnetic tape during the magnetic tape cassette assembling operation.

On the other hand, there is less probability that the leader tape is damaged because it is smaller in thickness than the magnetic tape.

Heretofore, when in a magnetic tape cassette manufacturing operation the above-described defect is found at the tape junction or on the magnetic tape, the magnetic tape cassette is disassembled to elminate the defect, or a manually operated junction jig is used to pull the magnetic tape out of the cassette case without disassembling the cassette to eliminate the defect to thereby make the magnetic tape cassette acceptable. However, the method for eliminating the defect is low in working efficiency because it is practiced substantially manually. Furthermore, the method suffers from a difficulty that secondary troubles are caused which may form another defect during the defect eliminating operation.

SUMMARY OF THE INVENTION

In view of the foregoing, an object of this invention is to provide a tape defect eliminating method in which, where a magnetic tape cassette has defects at the junctions of the magnetic tape and its leader tape or on the magnetic tape, the defects are readily and quickly removed to make the magnetic tape cassette acceptable as a product.

The foregoing object of this invention has been achieved by the provision of a method of elminating a defective part from a magnetic tape. According to the invention, there are a pair of rotatable tape winding members on which a magnetic tape with leader tapes at both ends is wound. One of the leader tapes and the magnetic tape are pulled out of the tape winding members by tape drawing means. The one leader tape and the magnetic tape are held on a stationary tape receiving stand and on a first movable tape receiving stand in such a manner that the spliced part of the one leader tape and the magnetic tape and one end portion of the one leader tape are on the stationary tape receiving stand. The one leader tape is cut at the gap between the two tape receiving stands into two parts with first and second tape cut end portions which are held on the stationary and the first movable tape receiving stands, respectively. The first movable tape receiving stand holding the second tape cut end portion of the leader tape is moved to a standby position while a second movable tape receiving stand holding a leading tape end portion wound on disposal tape winding means is moved to confront with the stationary tape receiving stand. The leading tape end portion and the first tape cut end portion on the stationary tape receiving stand are abutted against each other at the ends and are joined together with a splicing tape piece fed from splicing tape supplying means. The tape holding operations of the stationary and the second movable tape receiving stands are suspended, and at least the defective part of the magnetic tape is wound on the disposal tape winding means. The magnetic tape is held by the stationary and the second movable tape receiving stands and is cut at the gap between the stationary tape receiving stand and the second movable tape receiving stand into two parts with third and fourth tape cut end portions which are held respectively on the stationary and the second tape receiving stands. The second tape receiving stand is moved to the standby position while the first tape receiving stand is confronted with the stationary tape receiving stand so that the third tape cut end portion on the stationary tape receiving stand and the second tape cut end portion of the leader tape are abutted against each other at the ends. The third tape cut end portion of the magnetic tape and the second tape cut end of the leader tape are spliced together with a splicing tape piece supplied from the splicing tape supplying means. The tape holding operations of the stationary tape receiving stand and the first movable tape receiving stand are suspended, and the leader tape and the magnetic tape which have been pulled out and spliced are wound on the tape winding members.

DETAILED DESCRIPTION OF THE EMBODIMENTS

One example of an apparatus for practicing the tape defect eliminating method according to the invention (hereinafter referred to as "a tape defect eliminating apparatus") will be described with reference to a Beta or VHS system video tape cassette.

Figure 1:
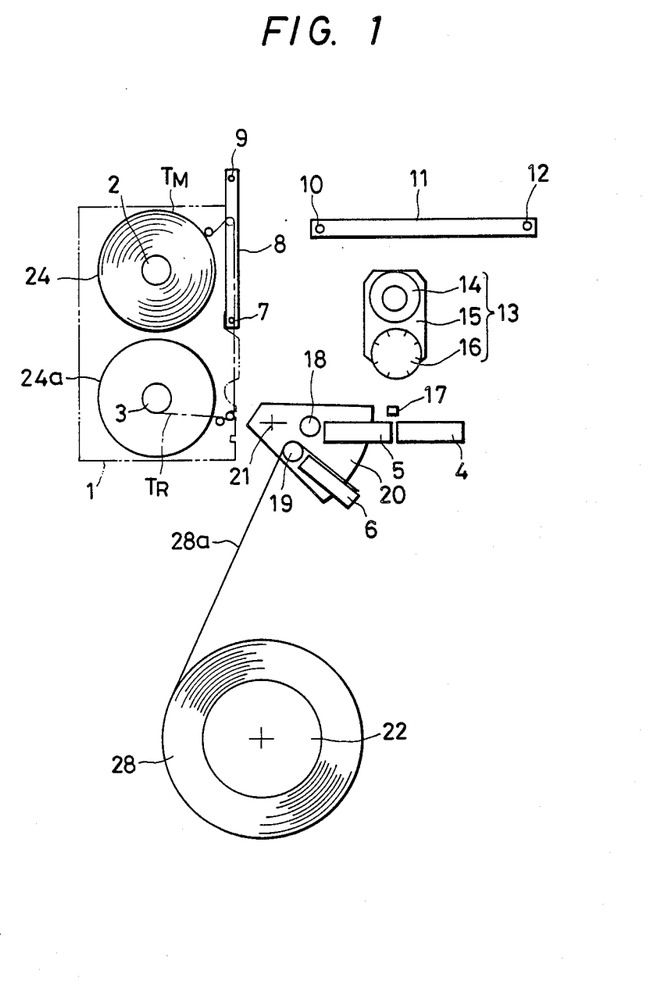
FIG. 1 is a plan view outlining the arrangement of essential components of an apparatus for practicing a tape defect eliminating method according to this invention.
Figure 2:
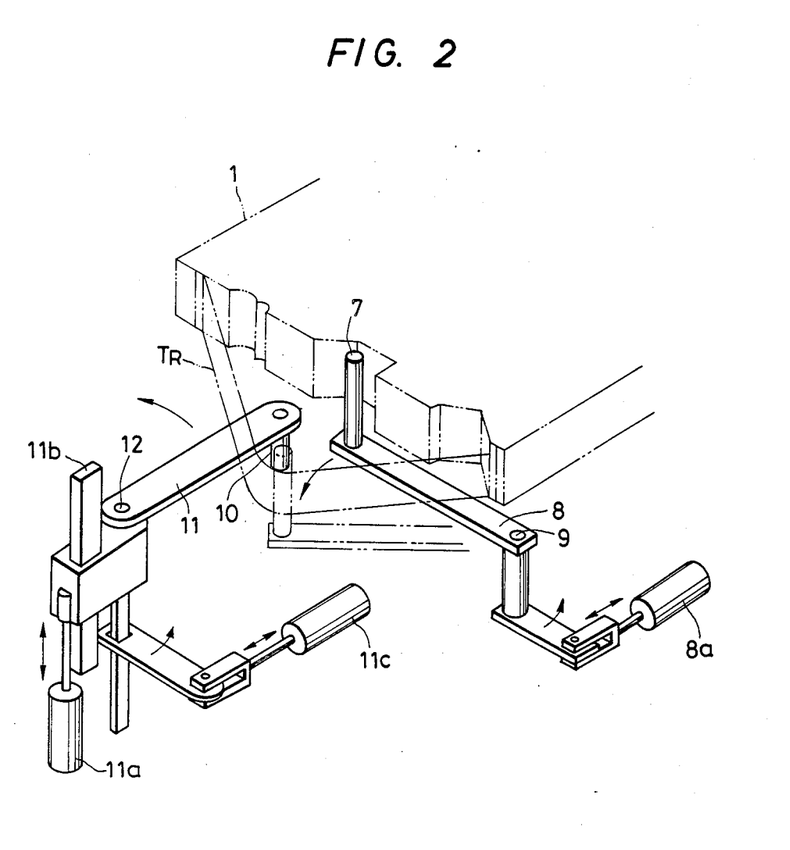
FIG. 2 is a perspective view for a description of the operation of leader tape drawing means in the apparatus shown in FIG. 1.
Figure 3:
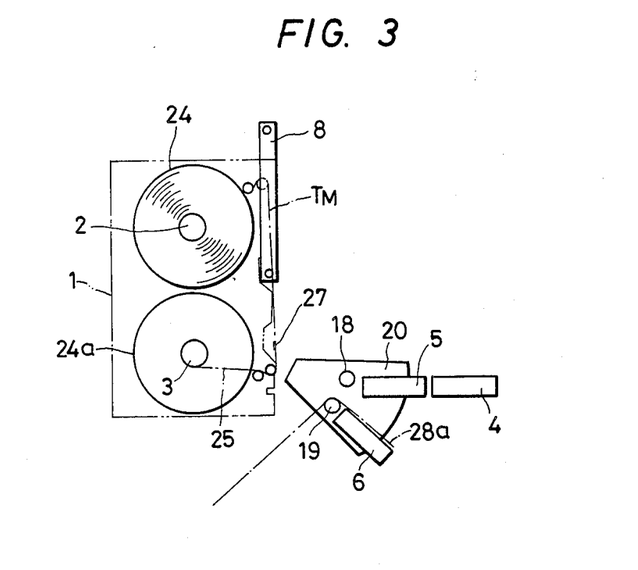
FIGS. 3 through 16 are diagrams successively showing the steps of eliminating a defective part from a tape with the apparatus shown in FIG. 1.

FIG. 1 is a plan view outlining the arrangement of the apparatus. FIG. 2 is a perspective view for a description of the operation of tape drawing means in the apparatus. FIGS. 3 through 16 are diagrams showing the steps of removing a defect from a magnetic tape with the apparatus.

The tape defect eliminating apparatus, as shown in FIG. 1, includes a cassette positioning stand (not shown) on which a magnetic tape cassette 1 (indicated by the two-dot chain line) is positioned. A winding-rewinding shaft 2 and a winding-rewinding shaft 3 are provided below the cassette positioning stand and have pawls engaging reels 24 and 24a. Tape drawing means draw a leader tape TR and a magnetic tape TM which are laid across the front opening of the cassette. The tape drawing means comprises first and second drawing arms 8 and 11, a splicing tape supply 13, tape cutting means (namely, a cutter 17), a stationary tape receiving stand 4, first and second movable tape receiving stands 5 and 6 disposal tape winding means (namely, a winding shaft 22), guide rollers for guiding the running of a magnetic tape, and a tension control system (not shown). These members are provided on a base board (not shown) or at least on one and the same plane.

The splicing tape supply 13 comprises a splicing tape reel 14 on which a splicing tape is wound, a tape feeding drum 16 for intermittently feeding the splicing tape from the splicing tape reel 14 and a holding plate 15 which supports the reel 14 and the drum 16. The splicing tape supply 13 is movable between a standby position and an operating position, for instance, movable vertically with respect to the base board. That is, the splicing tape supply 13 is so designed as to be able to go in and go out of the plane in which the tape is run, to thereby permit the smooth operations of the first and second drawing arms 8 and 11.

The cassette positioning stand is so designed as to be movable in the direction of the axes of the rewinding-winding shafts 2 and 3.

The first and second drawings arms 8 and 11 are designed as shown in FIG. 2 for instance. A pin 7 is rotatably provided on the end portion of the first drawing arm 8. The first arm 8 is so arranged that the pin 7 is caused to go from below into the space between the leader tape TR or magnetic tape TM and the cassette 1 and to swing about a swinging shaft 9 in parallel with the base board by driving means such as an air cylinder 8a. On the other hand, the second drawing arm 11 also has a pin 10 rotatably mounted on its end portion. The second drawing arm 11 is so designed that it is movable between an upper standby position and a lower operating position along a supporting shaft 11b perpendicular to the base board, for instance, by means of an air cylinder 11a so that the pin 10 goes into the loop formed by the leader tape TR and the magnetic tape TM which have been drawn out by the first drawing arm 8. Additionally, the second arm 11 is swingable about a swinging shaft 12 in parallel with the base board by means of an air cylinder 11c so that the magnetic tape TM is further drawn out.

The stationary tape receiving stand 4 of FIG. 1 has suction and retaining holes which are subjected to a negative pressure, for instance, with a vacuum pump to hold the leader tape TR or magnetic tape TM. The first and second movable tape receiving stands 5 and 6 also have the same suction and retaining holes. The first and second movable tape receiving stands 5 and 6 are secured to a common swinging table 20. The swinging table 20 is so driven by an air cylinder (not shown) or rotary actuator (not shown) that the movable tape receiving stands 5 and 6 are turned about a swinging shaft 21 and in parallel with the base board.

The steps of eliminating a defective part from a magnetic tape with the apparatus thus constructed will be described.

The magnetic tape cassette 1, which incorporates a pair of reels 24 and 24a on which a magnetic tape TM with leader tapes TR at both ends is wound (the magnetic tape TM being wound on the reel 24), is positioned on the cassette positioning stand. The cassette positioning stand is moved downward so as to be flush with the base board. As a result, the rewinding-winding shafts 2 and 3 are inserted into the reels 24 and 24a, respectively, and simultaneously the space between the cassette and the leader tape TR or magnetic tape TM (cf. FIGS. 2 and 3) is placed around the pin 7 of the first drawing arm 8. In this operation, the second drawing arm 11 and the splicing tape supplying means 13 are held at the standby positions; that is, they are held away from the region where the leader tape TR and the magnetic tape TM are pulled out.

Figure 4:
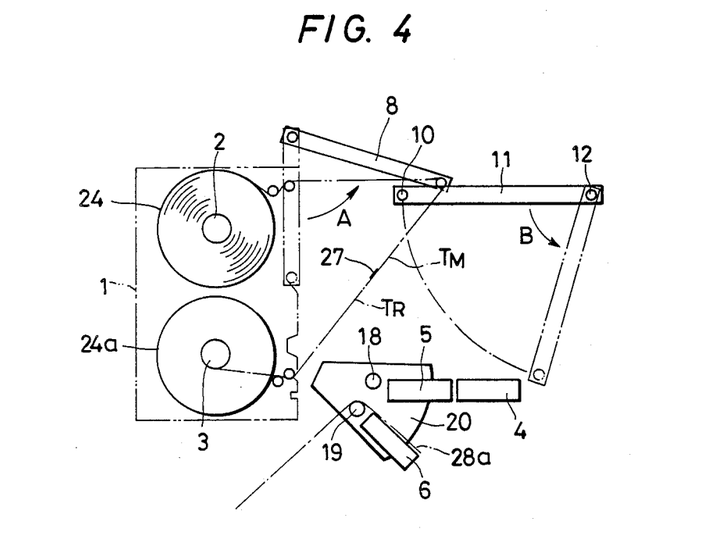

After the tape cassette 1 has been set as described above, the first drawing arm 8 is swung in the direction of the arrow A as shown in FIG. 4, thus drawing the tape for the first time. In this operation, the leader tape TR fastened to the reel 24a is drawn out in its entirety. Under this condition, the splicing tape piece 27 (the spliced part of the tape) which splices this leader tape TR and the magnetic tape TM together is detected by detecting means (not shown). The detecting means, as well known, can be composed of an LED transmitting light through the tape transport path to a phototransistor. Differential light transmission through the leader tape TR and the magnetic tape TM is detected. Then, the winding-rewinding shaft 3 is turns so that the leader tape TR is wound a suitable number of turns on the reel 24a to set the ends of the splicing tape piece 27 and the leader tape TR on the stationary tape receiving stand 4 in the following step. In succession, the second drawing arm 11 is moved perpendicuarly of the base board so that the pin 10 goes into the loop formed by the leader taper TR and the magnetic tape TM which have been pulled out. Thereafter, the second drawing arm 11 is swung about the swinging shaft 12 in the direction of the arrow B, to further draw out the magnetic tape TM from the reel 24.

Figure 5:
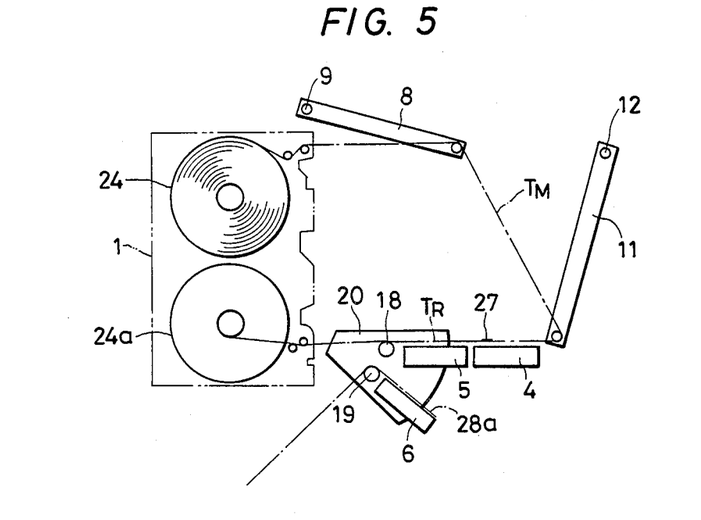
Figure 6:
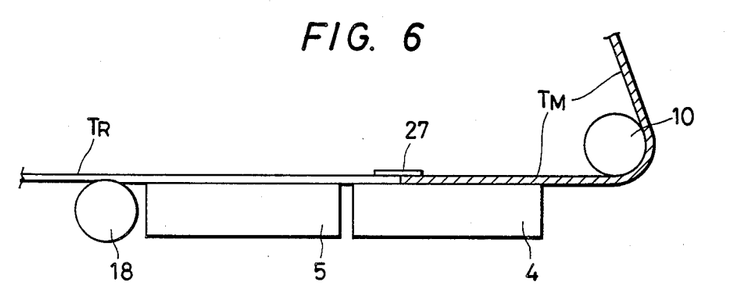
Figure 7:
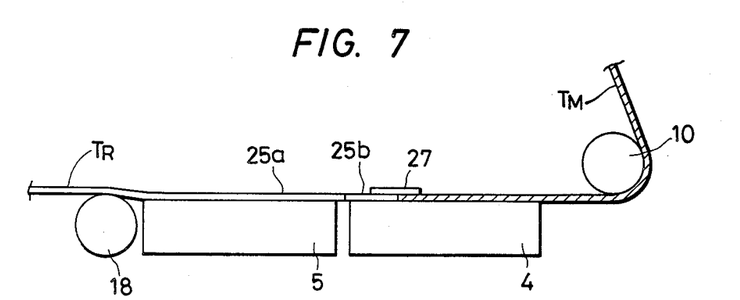

This tape drawing operation of the second drawing arm 11 lays the leader tape TR over the stationary tape receiving stand 4 and the first movable tape receiving stand 5 which is at the cutting and splicing position (FIGS. 5 and 6). In this case, as was described above, the splicing tape piece 27 is set on the stationary tape receiving stand 4. Under this condition, the vacuum pump (not shown) connected to the suction and retaining holes of the stationary tape receiving stand 4 and of the first movable tape receiving stand 5 is operated to suck and retain the leader tape TR and the magnetic tape TM thereon. Thereafter, the cutter 17 (FIG. 1)

provided below the base board is moved upwardly to cut the leader tape at the gap between the tape receiving stands 4 and 5 into two parts, as shown in FIG. 7. Tape cut end portions 25b and 25a which belong to the tapes wound on the reels 24 and 24a are separately held by the tape receiving stands 4 and 5 respectively.

Figure 8:
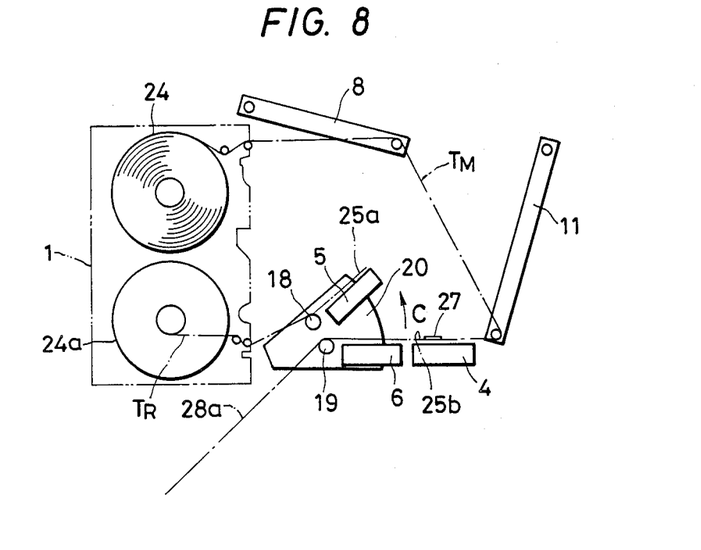

After the leader tape TR has been cut, the swinging table 20 is swung about the swinging shaft 21 in the direction of the arrow C and in parallel with the base board as shown in FIG. 8. That is, the first movable tape receiving stand 5 is moved to the standby position from the cutting and splicing position while holding the tape cut end portions 25a, while the second movable tape receiving stand 6 is moved to the cutting and splicing position where the first tape receiving stand 5 previously was. In this case, the second movable tape receiving stand 6 has been holding the disposal tape cut end portion 28a of the disposal tape roll 28 wound on the disposal tape winding means, namely, the winding shaft 22, or a leading tape end portion which is a dummy tape. Therefore, as the swinging table 20 swings, the leading tape end portion 28a and the tape cut end portion 25b are abutted against each other at their ends on the tape receiving stands 6 and 4.

Figure 9:
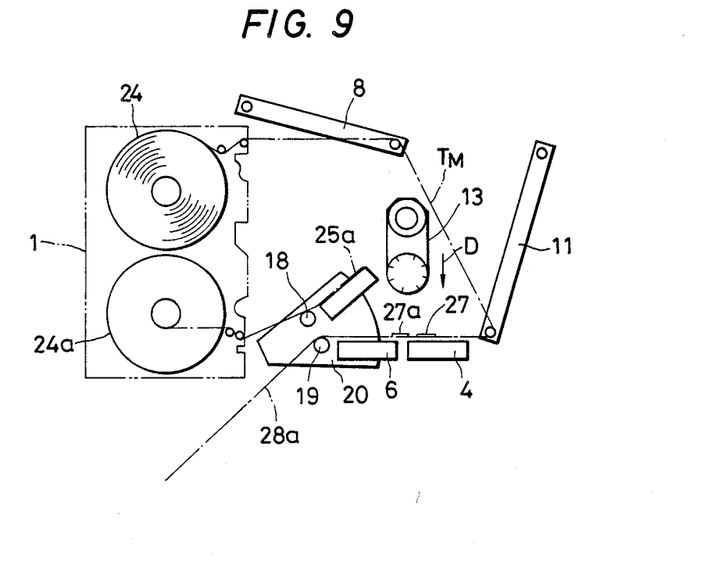

During the period of time which elapses from the completion of the tape drawing operation until the leading tape end portion 28 and the tape cut end portion 25b are abutted against each other, as shown in FIG. 9, the splicing tape supply 13 is moved from the standby position to the operating position. That is, it is moved into the region where the leader tape TR and the magnetic tape have been pulled out, and then it is moved in the direction of the arrow D (towards the butt joint of the tapes 28a and TM). Under this condition, the leading tape end portion 28a and the tape cut end portion 25b are joined together with a splicing tape piece 27a (cf. FIG. 10) supplied from the splicing tape supply.

Figure 10:
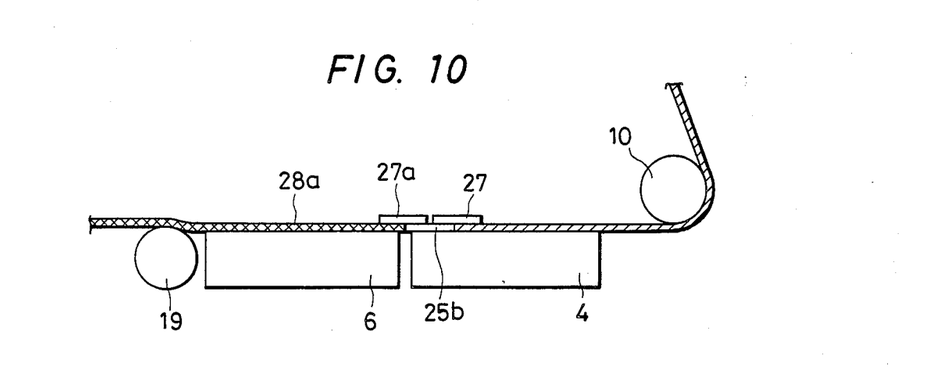
Figure 11:
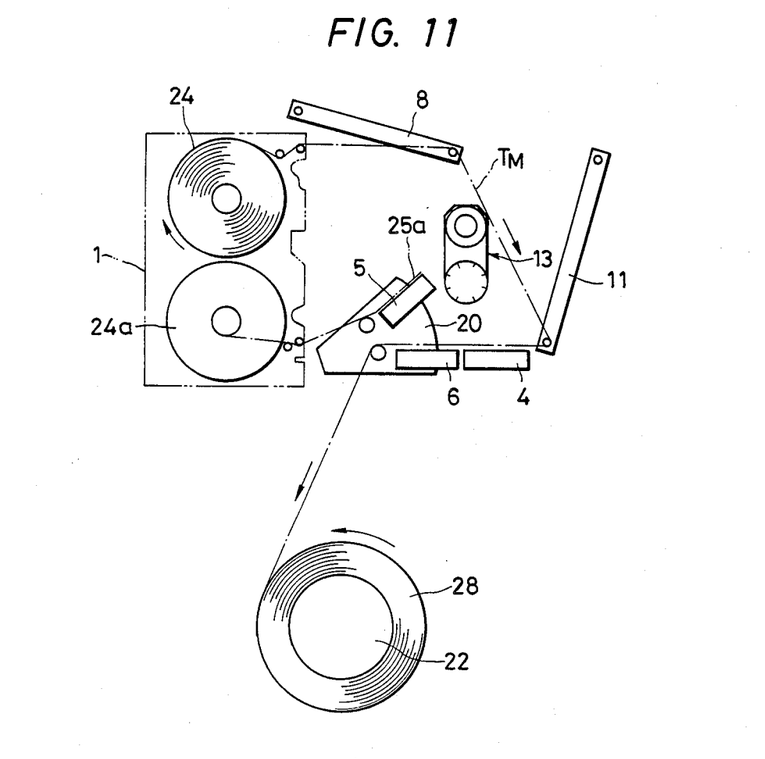

After the tape end portions 28a and 25b have been joined together as shown in FIG. 10, the tape sucking and retaining operations of the stationary tape receiving stand and the second movable tape receiving stand 6 are suspended and, as shown in FIG. 11, the winding shaft 22 of the disposal tape roll 28 is rotated by a pulse motor or the like to wind a predetermined length of the magnetic tape TM (having a defective part) onto the disposal tape roll 28.

Figure 12:
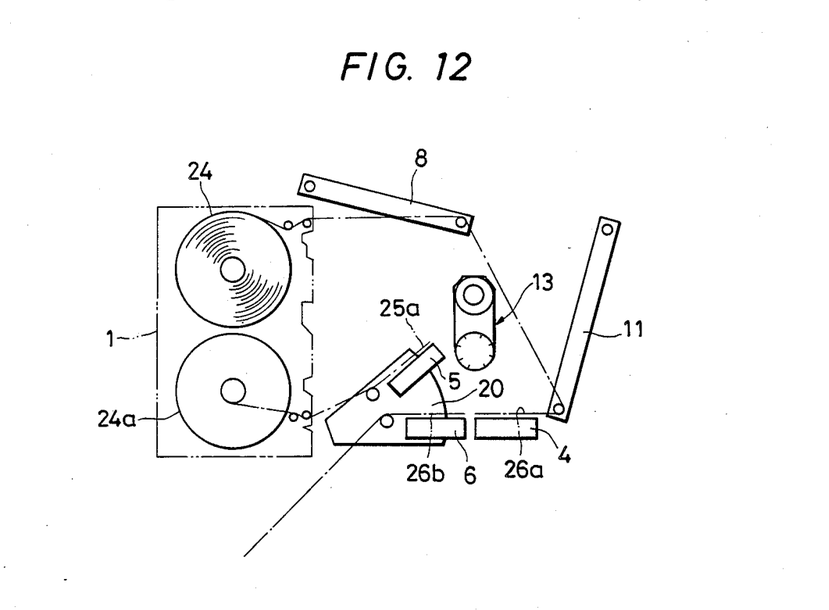

Upon completion of this tape winding operation, the magnetic tape TM having no defect is suctioned and retained by the stationary tape receiving stand 4 and the second movable tape receiving stand 6 and is then cut by the cutter 17 at the gap between the two tape receiving stands 4 and 6 into two parts, as shown in FIG. 12, with tape cut end portions 26a and 26b which belong to the tapes of the reel 24 and the disposal tape reel 28, respectively. The tape cut end portion 26b attached to the disposal tape reel 28 is the leading end portion for the next series of operation.

Figure 13:
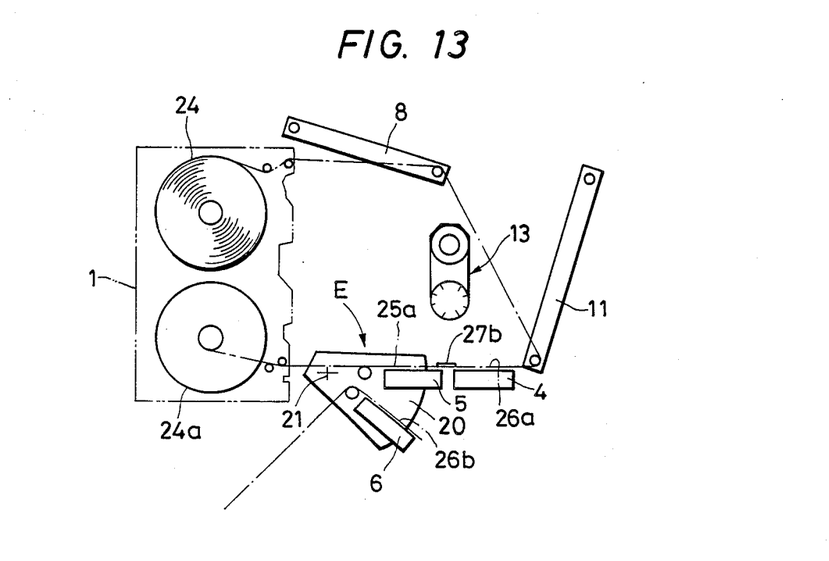

Then, the swinging table 20 is swung about the shaft 21 in the direction of the arrow E as shown in FIG. 13. That is, the second movable tape receiving stand 6 is moved to the standby position while holding the tape cut end portion 26b while the first movable tape receiving stand 5 is moved to the cutting and splicing position while suctioning and retaining the tape cut end portion 25a of the tape wound on the reel 24a in the cassette 1. Under this condition, the tape cut end portions 26a of the tape wound on the reel 24 and the tape cut end portion 25a of the tape wound on the reel 24a are spliced together with a splicing tape piece 27b by the splicing tape supply 13.

Figure 14:
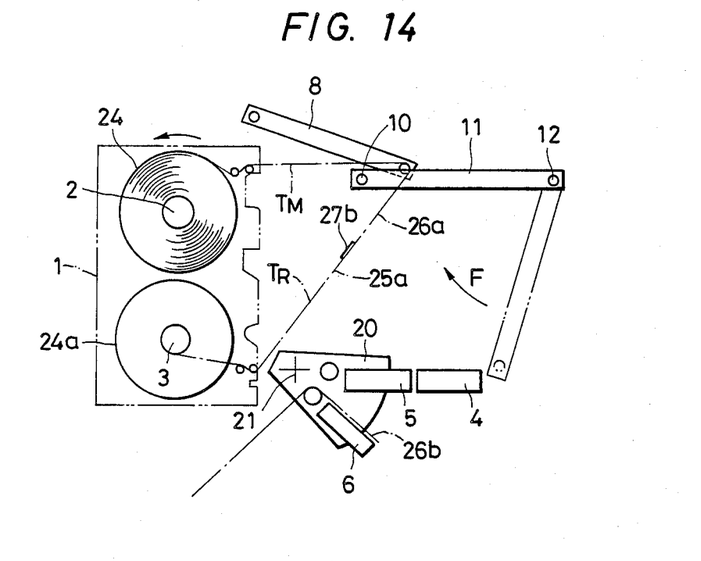

After this tape splicing operation, the splicing tape supply 13 is vertically moved out of the region where the first and second drawing arms 8 and 11 are swung. Then, the tape suctioning and retaining operations of the stationary tape receiving stand 4 and the first movable tape receiving stand 5 are suspended and a motor (not shown) turns the reel 24 counterclockwise through the winding-rewinding shaft 2. Simultaneously, as shown in FIG. 14, the second drawing arm 11 is swung clockwise about the swinging shaft 12 (in the direction of the arrow F) so that it is inside the region where the first drawing arm 8 swings so that the pin 10 is separated from the magnetic tape TM and the second drawing arm 11 is moved vertically upwards.

Figure 15:
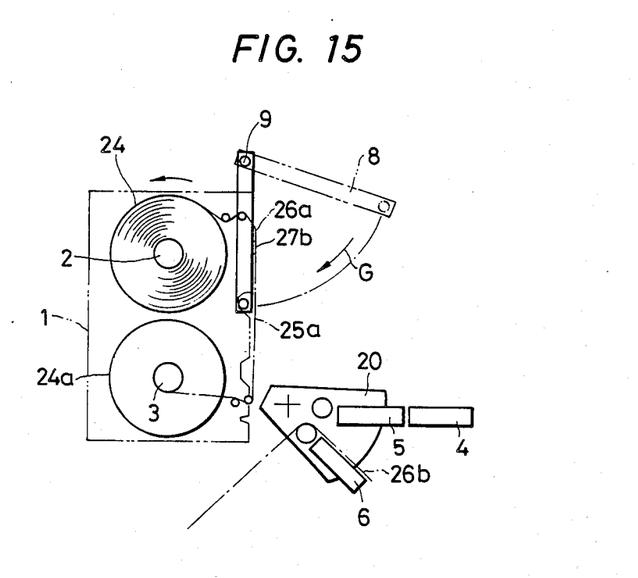

In the following operating step, as shown in FIG. 15, the first drawing arm 8 is swung clockwise about the swinging shaft 9 (in the direction of the arrow G) and the magnetic tape TM and the leader tape TR are wound on the reel 24 in the cassette by the motor coupled to the winding rewinding shaft 2 while the loop of the tapes TM and TR is kept tightly stretched.

Figure 16:
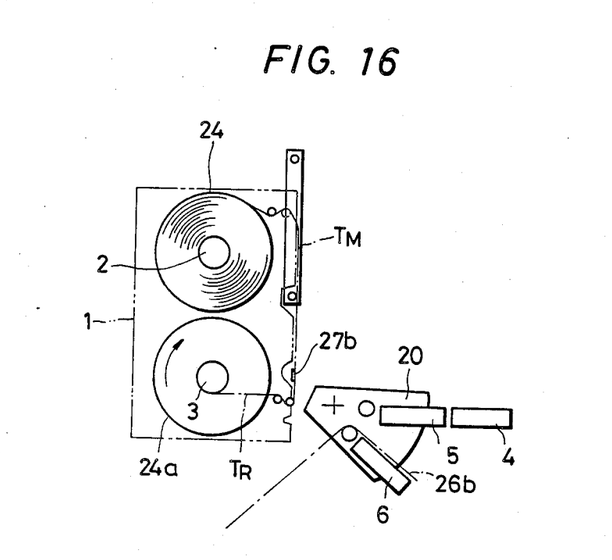

Next, as shown in FIG. 16, the tape is wound on the reel 24a by the motor coupled to the winding-rewinding shaft 3 so that the spliced part of the tape, i.e., the splicing tape piece 27b on the tape comes to the suitable position. Thus, the elimination of the defective part from the tape has been accomplished. Therefore, the cassette positioning stand is so moved that the winding-rewinding shafts 2 and 3 are disengaged from the reels 24 and 24a, respectively. Thus, all of the tape defect eliminating steps have been achieved.

This invention has been described with reference to the video tape cassette. However, it goes without saying that the invention is not limited thereto or thereby and is applicable to other tapes such as for instance 8 mm video tape cassettes. Furthermore, in the above-described embodiment of the invention, the magnetic tape is loaded in the cassette case. However, the invention is not limited thereto or thereby. For instance, the method of the invention is applicable to the magnetic tape wound on the pair of reels which have not been loaded in the cassette case yet.

As is apparent from the above detailed description, in the apparatus for practicing the method of the invention, the magnetic tape cassette set, the movable tape receiving stands, the stationary tape receiving stand, and the disposal tape roll are placed in one and the same plane, and the splicing tape supplying means can freely go in and out of the plane. The leader tape and the magnetic tape which are pulled out of the cassette. Therefore, in cutting and splicing the tape, the leader tape or magnetic tape will never be displaced in its widthwise direction, and therefore an excessively large amount of force will never act on the tape in the widthwise direction. Thus, the defective part can be quickly eliminated from the tape without breaking the tape or damaging the tape edges. That is, the method of the invention can quickly and positively remove defective parts from the magnetic tapes loaded in magnetic tape cassettes, thus providing magnetic tape cassettes which have no defects in their magnetic tapes.

What is claimed is:

1. A method for eliminating a defective portion of a recording tape:
    pulling out from two tape winding members on which a recording tape with a leader tape at an end thereof are wound at least one of said recording tape and said leader tape;

holding said pulled out recording tape and leader tape on a first movable tape receiving stand and a stationary receiving stand, said stationary tape receiving stand holding portions of both said leader tape and said recording tape;

cutting said leader tape at a gap between said two tape receiving stands, whereby said stationary tape receiving stand holds a first tape cut end portion and said first movable tape receiving stand holds a second tape cut end portion;

moving said first movable tape receiving stand holding said second tape cut end portion to a standby position;

moving a second movable tape receiving stand holding a leading tape end portion wound on a disposal tape winding means to confront said stationary tape receiving stand, whereby said leading tape end portion abuts said first tape cut end portion;

joining together said abutted leading tape end portion and said first tape cut end portion with a splicing tape;

winding a defective portion of said joined first tape cut end portion onto said disposal tape winding means while discontinuing said holding operations of said second movable tape receiving stand and said stationary receiving stand;

holding said first tape cut end portion with said second movable tape receiving stand and said stationary tape receiving stand;

cutting said held first tape cut end portion at a gap between said second movable tape receiving stand and said stationary tape receiving stand into two parts, whereby said stationary tape receiving stand holds a third tape cut end portion and said second movable tape receiving stand holds a fourth tape cut end portion;

moving said second tape receiving stand to a standby position;

moving said first movable tape receiving stand to confront said stationary tape receiving stand, whereby said third tape cut end portion abuts said second tape cut end portion; and splicing together said abutted third tape cut end portion and said second tape cut end portion with a splicing tape.

2. A method as recited in claim 1, further comprising:

suspending said holding operations of said first movable tape receiving stand and said stationary tape receiving stand; and winding said leader tape and said magnetic tape onto said tape winding members.

3. A method as recited in claim 2, wherein said four moving steps move said first and second movable tape receiving stands within a common plane common to said tape winding members and said disposal tape winding means.

4. A method as recited in claim 3, further comprising the steps of supplying said splicing tape from a supply means and moving said supply means into and out of said common plane.

5. A tape repair device for removing defective portions of a recording tape, comprising:

means for holding two tape winding members on which the tape is wound;

a first and a second movable tape receiving stand each movable between respective standby positions and an operating position and a stationary tape receiving stand, each of said three stands selectively capable of holding said tape, said stationary tape receiving stand being closely adjacent first or second movable tape receiving stand at said operating position;

means for leading said tape wound on said tape winding members onto said stationary tape receiving stand and said first movable tape receiving stand located at said operating position;

a disposal tape reel wound with tape selectively held by said second movable tape receiving stand;

means for cutting said tape in a gap between said stationary tape receiving stand and said first movable tape receiving stand in said operating position and in a gap between said stationary receiving stand and said second movable stationary stand in said operating position;

means for applying a splicing tape between a tape held by said stationary tape receiving stand and a tape held by said first movable tape receiving stand in said operating position and between a tape held by said stationary tape receiving stand and a tape held by said second movable tape receiving stand in said operating position;

wherein said stationary and first and second movable tape receiving stands, said winding members, and said disposal tape reel are disposed in a common plane and said first and second movable tape receiving stands move in said common plane, whereby defective portions of the tape may be wound off the winding members and onto the disposal tape reel when tape held by said second movable tape receiving stand is attached to tape held by said stationary tape receiving stand by said splicing tape.

* * * * *